April 11, 1967 M. R. KRAYNIK ETAL 3,313,145
RAPID VISCOSITY TESTING SYSTEM
Filed Sept. 22, 1964
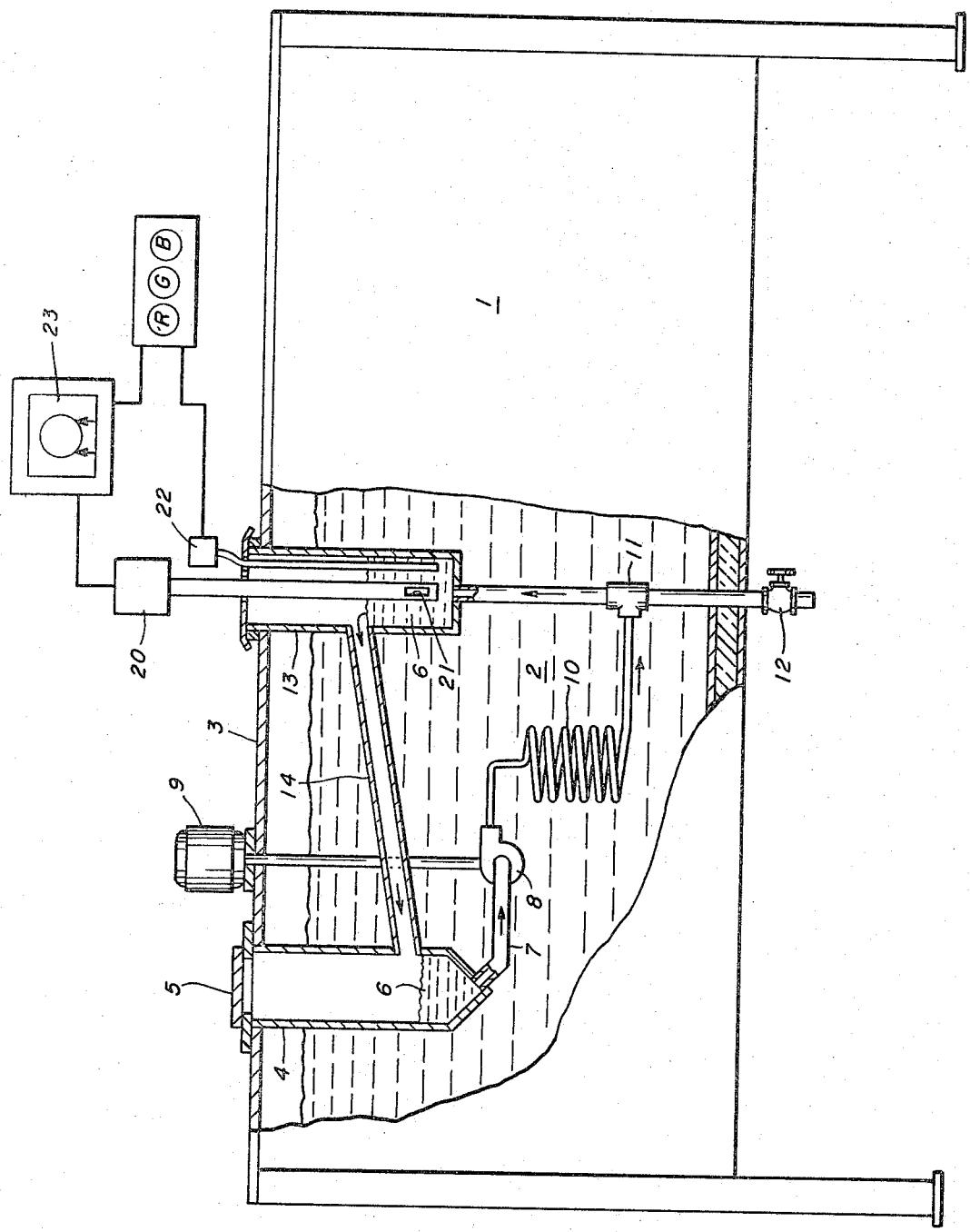
INVENTORS
MICHAEL R. KRAYNIK and
THOMAS J. REBARCHAK
By Donald G. Dalton
Attorney though the invention has been shown
United States Patent Office 3,313,145
Patented Apr. 11, 1967

3,313,145
RAPID VISCOSITY TESTING SYSTEM
Michael R. Kraynik, Gary, and Thomas J. Rebarchak, Chesterton, Ind., assignors to United States Steel Corporation, a corporation of Delaware
Filed Sept. 22, 1964, Ser. No. 398,204
1 Claim. (Cl. 73—54)

This invention principally pertains to a device for rapidly achieving a predetermined temperature in a specimen to be tested in a viscosimeter or the like, where a test specimen of predetermined temperature is required.

In general, the foregoing purpose is achieved by means of the forced recirculation of the test specimen through heat exchanger means, which are immersed in a constant temperature liquid bath, until the desired temperature is obtained. The foregoing heat exchange system is preferably employed in conjunction with a conventional, rapidly responding, viscosimeter, and conventional indicating and recording thermometric means.

The invention is particularly applicable to the determination of the viscosity of fuel oil, petroleum oil, road tar, and the like, for process control purposes, where the achievement of rapid test results is of practical significance.

The device of the invention is adapted to incorporation in a movable field unit, and is preferably so installed. A portable field installation, as contemplated herein, obviates the need for sending viscosity test specimens to a remote central laboratory, involving hours of delay as a result of the transmission time and the slower test procedures conventionally employed.

Time delay is a significant disadvantage in process control tests, as is apparent from the continuous blending of pitch and cutting oil for use in open hearths of steel producing facilities, for example, where the aforementioned delay may result in off-specification product, with decreased furnace efficiency.

Also, the disadvantage in failure to receive prompt test results is apparent in certain batch processes, such as the mixing of road tar, where delays in test results delay truck loadings, for example.

The device of the invention permits unskilled field personnel to conduct viscosity tests of the types contemplated.

The drawing is a diagrammatic elevational view of the apparatus of the invention, as installed in a constant temperature bath, portions of the latter being broken away to permit a better view of the invention.

Various elements of the invention are mounted in tank 1 containing bath liquid 2, the latter being maintained at constant temperature by conventional heating and cooling means, not shown. Bath cover 3 provides a convenient means of support for the various components mounted in the tank, as shown.

The generally tubular shaped container 4 is fitted with cover 5 which is removed for introduction of test specimen 6. The lower end of container 4 has outlet tube 7 leading to the inlet side of circulating pump 8 which is operated by shaft connected motor 9. Pump 8 discharges into heat-exchanger coil 10, which in turn discharges into T-connection 11, which latter has legs leading to shut-off valve 12 and specimen sump 13. With valve 12 closed, specimen 6 flows under pump action into sump 13 provided with over-flow pipe 14 which returns specimen to container 4, where it is available for recircualtion for additional heat exchange with bath liquid 2. With shut-off valve 12 open, specimen 6 is purged from the apparatus elements 4, 7, 8, 10 and 13. Purging is required before the next specimen may be introduced into chamber 4.

Viscosimeter 20, with test specimen intake port 21 and measuring element located below the overflow outlet, is of conventional type, for example Norcross Model RN–MAO Viscometer. A Brookfield Viscosel type viscosimeter could also be used. In this case 21 would correspond to the spindle while 20 would be the viscosimeter. A viscosimeter capable of delivering an electrical signal is preferably employed.

Conventional temperature indicator 22, also capable of delivering an electrical signal, such as Williamson Industrial Radiometer, has a sensing element immersed in specimen 6. The indicator is electrically connected by conventional means to red, green, and blue electric lights, designated R, G, and B, respectively.

Both viscosimeter 20 and temperature indicator 22 are electrically connected to graphic recorder 23, which is of conventional type, and permits simultaneous recording of the temperature and viscosity of the test specimen. The indicators, per se, and graphic recorder, are positioned outside of the bath, as shown in the drawing.

In operation, a test specimen is introduced into container 4 and recirculated by pump 8, in heat exchange contact with bath liquid 2, until it has reached the desired test temperature, as reflected by the lighting of the green light. The red and blue lights indicate high and low specimen temperatures, respectively.

In the case of a road tar or blend fuel taken from a process line at a temperature of about 400° F., and immediately placed in container 4 and recirculated, a desired test temperature of 240° F. is reached in about 15 minutes.

While one embodiment of the invention has been shown and described, it will be apparent that other adaptations and modifications may be made without departing from the spirit of the invention.

We claim:
A system for rapidly testing the viscosity of road tar, blend fuel, and the like comprising a constant temperature bath, a container immersed therein for receiving test specimens, said container having an outlet at the bottom thereof fluid-flowably connected to the inlet of a circulating pump which has its outlet fluid-flowably connected to the inlet of a heat exchanger immersed in said bath, the outlet of which is fluid-flowably connected to a specimen sump immersed in said bath, which sump has an overflow fluid-flowably connected with said specimen receiving container immersed in said bath, said sump having immersed therein a viscosimeter measuring element and a temperature sensing element, with means for recording and indicating specimen viscosity and temperature positioned outside of said bath.

References Cited by the Examiner
UNITED STATES PATENTS 3,115,768   12/1963   Rhodes et al. _____ 73—55
3,116,630   1/1964   Piros _____ 73—55

DAVID SCHONBERG, *Primary Examiner.*